United States Patent Office 3,632,733
Patented Jan. 4, 1972

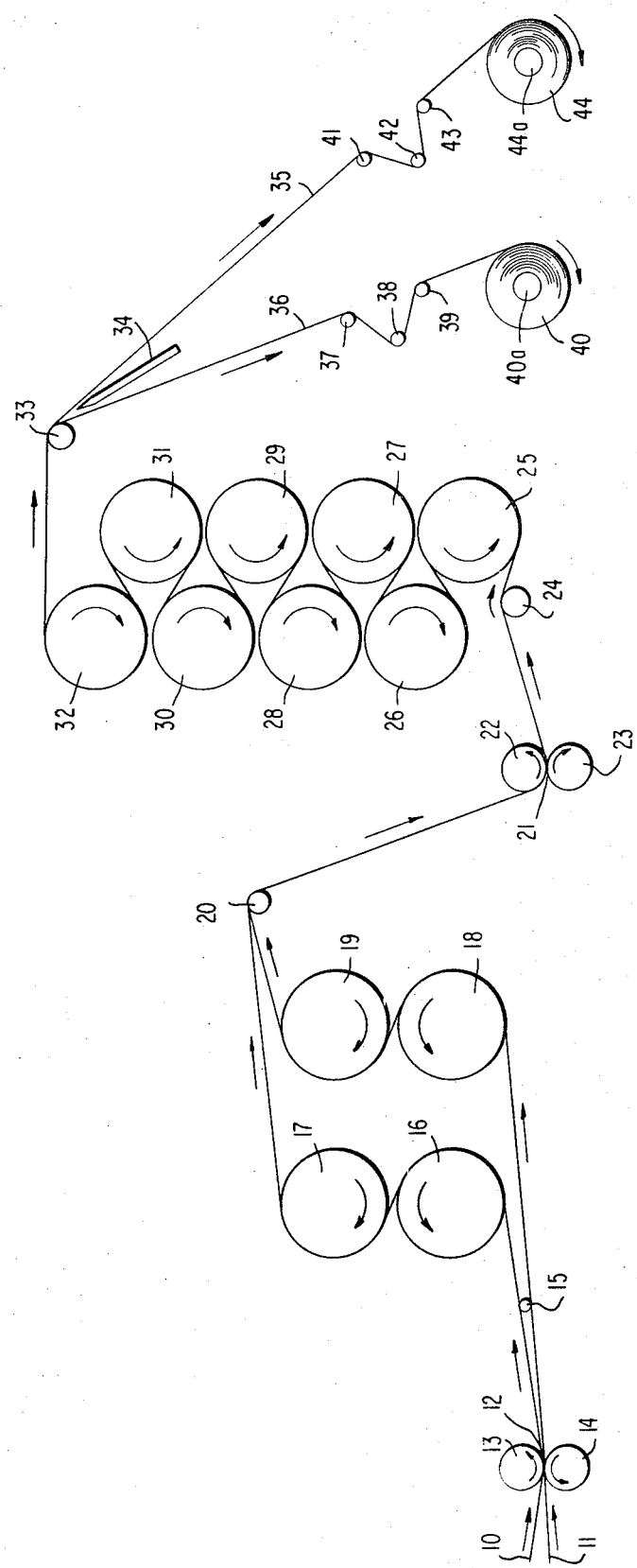

3,632,733
HEAT TREATING TWO-PLY BIAXIALLY ORIENTED FILMS
Masahide Yazawa, Tokyo, Japan, assignor to Kabushiki Kaisha Kobunshi Kako Kenkyujo, Tokyo, Japan
Filed Mar. 5, 1969, Ser. No. 804,541
Claims priority, application Japan, Mar. 5, 1968, 43/14,218
Int. Cl. B29c 25/00
U.S. Cl. 264—342                                                6 Claims

ABSTRACT OF THE DISCLOSURE

Heat treatment of biaxially oriented film comprising overlapping two plies of film leaving a thin air layer between them and passing the composite over and under heating cylinders of generally increasing temperature and decreasing speeds while blowing cooling air on the surface of the composite not in contact with the cylinder. By using two plies of film, one serves as a back-up sheet while the other is being directly heated. The transverse contraction during processing is minimized and low residual shrinkage is achieved.

SUMMARY OF THE INVENTION

This invention relates to an improved process for the heat treatment of biaxially stretched synthetic resin films.

BACKGROUND OF THE INVENTION

In heat treatment processes of the prior art, stretched synthetic resin films were progressively passed around a series of heating cylinders kept at serially elevated temperatures. These thus processed films underwent considerable dimensional reduction in the transverse direction of the film. The lateral dimensional reduction or contraction generally amounted to several percent, which reduction was further increased when the film was kept in a constant state of tension without allowing any extent of relaxation in the longitudinal direction during the processing stage. This lateral shrinkage constitutes a considerable drawback to the above-described processing technique.

In order to avoid this dimensional reduction, it has been proposed to provide a back-up sheet or belt, preferably of endless type, to the film under treatment, so as to suppress the lateral film shrinkage. In practice, however, another drawback is encountered in that the film surface kept in contact with the back-up sheet, which is usually made of felt or the like, is subjected to an embossing effect caused by the pressured contact with the rough surface of the sheet, thus preventing the formation of the desirous smooth film surface.

OBJECTS OF THE INVENTION

It is, accordingly, the main object of the invention to provide an improved process for the heat treatment of biaxially stretched synthetic resin films in which conventionally encountered transverse contraction is reduced.

It is a further object of the invention to provide a heat treatment process capable of producing products having smooth surfaces, highly adapted for printing or the like.

It is a still further object of producing the invention to provide a heat treatment process capable of products which have smooth surfaces, said process being nevertheless simple in the design and arrangement of the necessary treating means, easy to practice and highly efficient.

It is a further object of the invention to provide a heat treatment process capable of producing highly dimensionally stabilized, biaxially oriented resin films.

It is still a further object of the invention to provide a process which is highly adaptable for the heat treatment of biaxially stretched tubular synthetic resin stocks after being longitudinally cut into plane sheets.

It has been found that the aforesaid objects may be achieved in accordance with the process of this invention as described below. A suitable polymer is first extruded through an annular die opening to form a continuous tubing, which is then inflated by the introduction of hot and pressurized air or the like. The thus biaxially stretched tubing is cooled and cut into two sheets of identical dimensions, to thus obtain thoroughly overlapped film sheets one on the other sheet, a thin layer of air being entrapped between the sheets. These overlapped film sheet are then passed over successive heated cylinders, arranged in pairs, in such a manner that the sheets are allowed alternatively to contact directly with said cylinders that is, while one sheet is being heated, the other sheet serves as a back-up sheet. The pairs may be maintained at successively increasing temperatures. From the heated cylinders, the composite film sheets are passed to a separator which separates the sheets. The separated sheets are then wound into rolls. The peripheral speeds of the successive cylinders are successively reduced to relax anneal the films. In another embodiment the pressed sheets are heated to form a coherent composite, and then wound into a roll.

DETAILED DESCRIPTION

The treating film stocks utilizable in this invention are manufactured from synthetic resin film tubes. These tubes are prepared from molten synthetic resin materials which are extruded from an annular die, thus forming a continuous tubing and then biaxially stretched in accordance with an inflation technique whereby a pressurized hot gaseous medium, such as stream or heated compressed air, is blown into the tubing, causing it to inflate. This continuous, biaxially stretched film tube is subjected to a cooling step, utilizing a suitable cooling medium such as cold water, to fix the biaxial orientation of the film caused by the biaxial stretching at an elevated temperature. The inflated tubing is then subjected to a cutting step wherein a pair of cutting knives are kept in contact with the tubing at two selected points which are in diametrical opposition to each other and correspond to the edges of the tubing when collapsed flat, so as to provide a pair of continuous film sheets of identical dimension.

The thus produced two continuous film sheets are passed between a pair of squeezing rolls to remove, as completely as possible, residual water from the films. The squeezed films are then passed in their separated conditions around a separated series of drier cylinders kept at a slightly elevated temperature, for example, 40–50° C., to dry the film sheets without causing any appreciable dimensional contraction. When hot air is used in place of steam in the tube inflation step and the cooling and fixing step is performed with cold air, the above-mentioned squeezing and drying steps may be dispensed with. The two continuous mating film sheets are then conjointly overlapped and passed around a plurality of heating cylinders, the temperatures of said cylinders being selected such that they are maintained at successively higher temperatures in the travelling direction of the sheets. The two mating film sheets are alternately brought into contact with successive heating cylinders. During this processing stage, the peripheral speeds of the successive cylinders are stepwise and successively reduced so that the mating and alternate two heat-treated film sheets are allowed to contact substantially in their longitudinal direction so as to attain relax-annealing. The thus heat-treated films are separated from each other prior to being wound into separate respective film rolls. Alternatively, the processed film sheets are compressed together at elevated temperature to form two-ply sheets and then wound up into a roll.

Further objects, features and advantages of the present invention will be apparent from a more detailed consideration and by reference to the drawing and preferred examples. The drawing is directed to a preferred embodiment of the apparatus, shown in a highly simplified and schematic manner, in a substantially elevational view.

Referring now to the drawing, 10 and 11 denote a pair of film sheet stocks prepared from a suitable thermoplastic resin material of linear polymer such as, for instance, polypropylene, high density polyethylene, polystyrene, polyester, polyvinyl chloride or the like, which has been formed into biaxially stretched continuous tubing by the inflation techniques described above, after being cut into two sheets and water cooled for fixation of the thus realized molecular orientation. These film sheets are passed together through nip line 12 formed between a pair of squeezing rolls 13 and 14, thereby removing water, and then separated mechanically from each other by inserting a stationary separator bar 15 between the travelling film sheets. The separated upper sheet 10 is passed around a pair of dryer cylinders 16 and 17, successively, in an alternating manner, as shown. The lower film sheet 11 is passed in a similar manner around a further pair of dryer cylinders 18 and 19. These cylinders 16–19 are kept at a slightly elevated temperature, normally from 40 to 50° C., keeping the biaxially stretched films substantially in a non-contracting state. The heating medium in these cylinders may preferably be hot water. Hot air may be used for accelerating the drying process. This additional drying means is not shown in the drawing. The thus dried film sheets are conjointly overlapped by passing said sheets around a stationary guide bar 20, and then passing through nip line 21 formed between a pair of pressure rolls 22 and 23. Although not shown, the film sheets are guided through a conventional edge control means, so as to bring one side of their side edges in line during their travel between guide bar 20 and rolls 22–23, the temperature of the sheets is kept, at this processing stage, preferably between 40–50° C. By this procedure, a substantial part of the air entrapped between film sheets is driven out, thus leaving a very thin air layer between the film sheets. This thin air layer is necessary to the carrying out of the heating treatment of this invention in an optimum manner.

These conjointed films 10 and 11 are then, upon passage around a stationary guide 24, passed over the first cylinder 25 of the first heating stage which includes a further heating cylinder 26. When the overlapped film sheets are thus brought into contact with the heating cylinder 25, the inside sheet 10 is heated by direct physical contact with the cylinder surface. The second, or outer sheet 11, acting in this case as a backing up sheet, is heated to a lesser temperature than the inside sheet due to the presence of the thin air layer existing between the inside and the outside film sheets.

However, when the films are very thin, the outside film is liable to undergo considerable heating due to thermal conduction from inside to outside, and it may be necessary to employ a cooling means so designed and arranged as to blow a cooling air stream against the exposed surface of the outside film sheet to prevent excessive heating thereof, thereby preventing disadvantageous shrinkage. The need for this additional cooling is dependent upon the particular kind of the film material used, the thickness of the film, and the feeding or travelling speed thereof. For thin films of lower melting point, and travelling at slower speeds, it is necessary to cool the outside film sheet. Said outside cooling serves to increase the static friction between the cylinder and the inside sheet. In the drawing such cooling means have been omitted for the sake of simplicity. Under normal operational conditions, however, the outside film sheet effectively acts as a protecting means for substantially preventing transverse film shrinkage, additionally serving as an insulator for preventing heat dissipation to the ambient atmosphere from the heated inside film sheet. Although the inside film sheet has a natural tendency to thermally contract in its transversal direction when heated up in the above-mentioned way, the intensified pressure contact of this sheet against the heating cylinder surface exerted by the outside film sheet forcibly prevents the thermal contraction thereof to a substantial degree. Thereby, the inside sheet is subjected to a heat treatment under conditions adapted for preventing transverse shrinkage. Transverse shrinkage may result when both sheets lose contact with the heating cylinder surface. However, as the inside film sheet is tightly and intimately contacted with the inside surface of the outside film sheet, this kind of shrinkage is substantially prevented. If, on the other hand, both film sheets make contact with the cylinders independently of each other, the transversal contraction cannot be prevented. Since there is a substantially high frictional or slip resistance between the sheets, the transverse contraction of the inside sheet is forcibly suppressed by the outside sheet.

The film sheets are then brought into contact with the next heating cylinder 26. In this case, the former inside sheet 10 acts as the backing sheet, while the former outside sheet 11 becomes the inside sheet, and the aforementioned heat treatment is repeated under these new treating conditions. Heating cylinders 25 and 26 are kept at 80° C. Optionally, second cylinder 26 may be heated up to a somewhat higher temperature than that of first cylinder 25. The heating medium is warmed water. The circulating means provided for this purpose has been omitted from the drawing for the sake of simplicity. If necessary, second cylinder 26 may also be fitted with an outside air cooling means, for the effective cooling of the outer layer film sheet 10, which now serves as the backing for now inside film sheet 11.

The thus heat-treated film sheets are passed alternately around the next group of heating cylinders 27 and 28. This second group of cylinders is kept at a temperature about 15–20° C. higher than that of the first group. Optionally, first cylinder 27 can be heated to a somewhat lower temperature than second cylinder 28. Cooling means may also be provided for the same purpose as disclosed above for the first heating cylinder group.

The above-described conditions and cooling means are also applicable to successive heating cylinder groups. The advancing film sheets are processed in a similar manner to the processing at the first heating group, though at further increased temperatures. The same method of operation is further repeated with the third and fourth groups of heating cylinders.

Cylinders 29 and 30 of the third group are kept at temperatures 15–30° C. higher than that of the second group. The first cylinder 29 is rotated at a somewhat slower speed than the second cylinder 30. The sheets are then passed around two successive heating cylinders 31 and 32 which are kept at a higher temperature than that of the third group, this fourth or the last group of cylinders being heated to the maximum optimum temperature. Each of the above-described heating cylinder groups may alternatively contain three or four cylinders. The successive cylinders of each of the heating groups may be kept at the same temperatures, or may be heated to slightly higher temperatures.

Upon completion of the above-described heat treatment, wherein shrinkage of the biaxially oriented film sheets is avoided, the sheets are conveyed in their overlapped state around a stationary guide bar 33 and finally to a stationary knife-shaped separator 34 inserted between the sheets to bring about a separation. When the actuating pressure caused by a tension to which the sheets are subjected is moderate, the separating can easily be performed.

One of the separated sheets at 36 is then passed around the stationary guides or rotatable rollers 37–39, in a successive and alternating way as shown, avoiding any possible wrinkle formation, and finally wound into a roll 40 around a rotating winder core 40A. The other separated sheet 35 is similarly passed around a series of stationary guides or rotatable guide rollers 41–43 and finally wound into a roll 44 around a winder core 44A.

The separation of sheets 34 and 35 is carried out when these sheets are still hot. Even when slightly cooled, they can be easily individually separated. The sheets will have high dimensional stability, even though subjected to mechanical stresses in the course of the separating process, provided the contacting surfaces of both sheets are not too cold. If the exposed surface of one of the sheets is considerably cooler than the other, one sheet will have an increased dimensional stability relative to the other.

The preparation of the continuous tubing can be so performed that during the extrusion of the thermoplastic resin material the annular slit die is kept in rotation. Any possible unevenness in the tube wall thickness is distributed over the whole periphery of the tubing even after completion of biaxial stretching and heat treating, thus providing the heat-treated continuous film sheets of a beautiful appearance even when wound into their respective rolls.

If desired, the sheets heat-treated in their overlapped conditons in the above-mentioned way are subjected additionally to substantially increased treating pressures so as to provide a unified two-ply film sheet. In this case, knife-edged separator 34 is dispensed with. This two-ply sheet is then wound up into a single roll.

When polypropylene is used as the tubing material, the heating cylinder groups may preferably be successively heated to 80° C., 100° C., 115° C., 135° C. and 145° C., when five groups of heating cylinders are employed. If the biaxially oriented tubing is prepared from high density polyethylene and there are four heat-treating cylinder groups, the successively increased temperatures may respectively be 80 C., 100° C., 115° C. and 124° C. Poly-vinyl chloride film sheets prepared from continuous tubing may advantageously be heat-treated in three stages at 75° C., 90° C., and 115° C. Polystyrene film sheets can be heat-treated in four stages at 90° C., 105° C., 120 C. and 130° C., respectively. Polyester film sheets can be treated preferably in four stages at 130° C., 160° C., 175° C. and 200° C., respectively. Those skilled in the art may easily select the number of the respective processing stages and the processing temperatures, being guided by the above data which is provided by way of example only, for selected well-known thermoplastic synthetic resin materials.

It has been found in the instant process that transverse shrinkage in the order of 5–7% occurs. Therefore, it is necessary to retard the rotation of each of the heat-treating cylinders relative to the foregoing one, so as to allow a longitudinal shrinkage amounting generally to about 10–15%. In this way, the heat-treated film sheets will be highly stabilized in both directions. As for the outer appearance of the processed sheet, especially the mirror-like appearance thereof, the firstly overlapped and then separated surface thereof has a disadvantageous characteristic relative to that of the other surface, which defect can however be remedied by passing the processed and separated sheet between a pair of hot calendering cylinders. This sheet, however, even when not subjected to calendering, can be effectively utilized for the manufacture of synthetic paper. When it is desired to provide a thicker sheet stock, the two processed film sheets are passed between a pair of heated pressure cylinders, thereby purging the intermediate air layer from the conjointed sheets and thereby forming the desired thicker sheet. By repeating the above-described process, a card board having any desired thickness may be made from a stack of biaxially oriented and dimensionally stabilized film sheets.

The preparation of the tubular material used in this invention may be carried out at a high speed, say 100–150 m./min. The heat-treatment process according to this invention can be performed at these speeds. Thus, a continuous process comprising extrusion of synthetic material into tubing, quenching and inflation thereof and heat-treatment of two-ply sheets made therefrom accompanied by the following winding-up operation can be realized at high processing speeds with considerable ease.

By way of example, thick sheets having a diameter of 120 mm., are prepared by extruding a thermoplastic resin through an annular slit die at a speed of 20 m./mm., followed by cold water quenching. The thus formed tubing is stretched by inflation with hot steam, thereby resulting in a tubing having a longitudinal elongation of 2.7 times and a transverse elongation of 3.0 times its original dimensions. The stretched tubing is then subjected again to water cooling and cutting. By cutting at two diametrical opposite positions the tubing is formed into two sheets of equal dimensions, having a width of 55 cm. after being flattened. These sheets are fed at the rate of 56 m./min. between a pair of pressure rolls, so as to remove adhering moisture, and then separated from each other. Each of these separated film sheets is dried by passing it through a drum type dryer kept at 65° C. temperature maintained by means of warmed water circulating therethrough. These sheets, still in their warmed condition, are then overlapped again to each other and passed through a pair of pressure rolls, so as to drive out the air entrapped between the overlapped film sheets. Then, the overlapped sheets, with a thin air layer between them, are passed through a five stage heating zone comprising 10 heating cylinders each cylinder having a diameter of 60 cm., arranged in a manner similar to that shown in the drawing. The five stage cylinder groups are kept at 80° C. by means of warmed water, 100° C., 115° C. and 147° C. by means of circulating steam respectively. A cold air stream is injected upon the films in the manner described above. The resulting films are biaxially oriented and dimensionally stabilized. The examples below are provided to more clearly illustrate the invention.

EXAMPLE 1

A continuous polypropylene tubing, 0.16 mm. thick, was extended and inflated to attain biaxial orientation, and cut to form into thoroughly overlapped sheets. The travelling speed of the overlappedly and alternatingly heat-treated film sheets was adjusted to 56 m., 53 m., 51 m. and again 51 m. per minute at respective processing stages, so as to allow a longitudinal contraction of about 9%. The overall lateral contraction measured upon completion of the heat treatment amounted to 10%. Therefore, the overall two-dimensional contraction of the sheets amounted to about 18%. The thus overlapped heat-treated two-ply sheet was separated into two sheet elements by contact with a knife-edged separator and individually wound onto respective rolls around respective winding cores. When these film sheets were subjected to heating at 120° C. for 2 minutes, they showed a two-dimensioned contraction of only 4–5% demonstrating their excellent dimensional stability.

EXAMPLE 2

The unseparated heat-treated overlapped sheet of Example 1 was directly passed, while still hot, through a pair of heated pressure rolls under a pressure of 100 kg. per square centimeter. The resulting composite film sheet is highly transparent and difficult to separate into its sheet elements. Said composite sheet has a thickness of 1.94 mm., a width of 50 cm., and is highly durable upon being heated.

EXAMPLE 3

Two two-ply sheets prepared as above were overlapped and passed around a plurality of heating drums or cylinders kept at 147° C. at the highest in an alternating manner as described above. The two-ply sheets were passed between a pair of heated pressure rolls under a pressure of 100–150 kgs. per square cm. The thus processed combined sheet had an overall thickness of 0.08 mm. In this case, no appreciable lateral contraction was observed. The rotational relative speeds and the relative temperatures used in this process are chosen so as to provide an overall two-dimensional relaxation or contraction of less than 25%, obtaining the desirous dimensional stabile products.

Having thus described my invention, what I now claim is:

1. In a process for heat-treating biaxially stretched and molecularly oriented film sheets of a thermoplastic resin selected from the group consisting of polypropylene, high density polyethylene, polystyrene, polyesters and polyvinyl chloride to obtain relax-annealed and dimensionally stabilized film sheets by passing said film sheets around a series of at least three sets of heating cylinders kept at specified individual temperature and rotated at successively reduced peripheral speeds, the improvement which comprises:

(a) thoroughly overlapping two of said film sheets of identical dimensions, one on the other, wherein a thin air layer is provided between said two film sheets in order to prevent said film sheets from adhering to each other;

(b) passing said overlapping film sheets around said series of at least three sets of heating cylinders, the heating cylinders within each set being at the same temperature or different and successively increasing temperatures, and each set of heating cylinders being at a temperature higher than the preceding set, wherein the temperature of said first set of said heating cylinders varies from 75 to 130° C., and wherein the temperature of said second set of heating cylinders is from 15 to 20° C. higher than the highest cylinder temperature of said first set of heating cylinders, and wherein the temperature of said third set of heating cylinders is from 15 to 30° C. higher than the highest cylinder temperature of said second set of heating cylinders, and wherein the outer opposite surfaces of each of said overlapping film sheets are alternatively contacted with the respective surfaces of adjacent heating cylinders, and wherein on one heating cylinder one of said overlapping film sheets is heated and the other of said overlapping film sheets functions as a back-up sheet, and on an adjacent heating cylinder, the other of said overlapping film sheets is heated while said one of said overlapping film sheets functions as a back-up sheet, the temperature of each of said sets of heating cylinders being such that transverse shrinkage of the sheet in contact with the heating cylinder is prevented, thereby assuring that the overall two-dimensional relaxation of said overlapping film sheets is less than 25%; and (c) cooling the outermost surface of said overlapping film sheets when said overlapping film sheets are in contact with said heating cylinder by blowing air against said outermost surface to prevent excessive heating thereof.

2. The process as in claim 1, wherein each of said heating cylinders comprising said set is at a different temperature, the first of said heating cylinders of said sets being at the lower temperature.

3. A process as in claim 1, wherein said thermoplastic resin is polypropylene and wherein 5 sets of said heating cylinders are employed, the respective temperatures of each of said sets being about 80° C., 100° C., 115° C., 135° C. and 145° C.

4. A process as in claim 1, wherein said overlapping films sheets are heat-treated at a rate of from 100 to 150 meters per minute.

5. A process as in claim 1, wherein said overlapping film sheets are separated into single film sheets after passing over the last of said heating cylinders.

6. A process as in claim 1, wherein said overlapping film sheets are subjected to heat-pressing under a pressure of from 100 to 150 kgs. per square cm. in order to form a single film sheet of a double thickness after passing over the last of said heating cylinders.

References Cited

UNITED STATES PATENTS

| | | | |
|---|---|---|---|
| 2,603,838 | 7/1952 | Lowry et al. | 264—346 |
| 2,976,567 | 3/1961 | Jones et al. | 264—210 |
| 3,380,868 | 4/1968 | Moser | 264—289 |
| 3,257,490 | 6/1966 | Hovermale et al. | 264—289 |

FOREIGN PATENTS

| | | | |
|---|---|---|---|
| 932,293 | 7/1963 | Great Britain | 264—342 |

JULIUS FROME, Primary Examiner

H. MINTZ, Assistant Examiner

U.S. Cl. X.R.

264—99, 235, 289, 345, 346